D. WARNER.
VEHICLE SEAT ATTACHMENT.
APPLICATION FILED JUNE 8, 1914.
1,147,771.
Patented July 27, 1915.
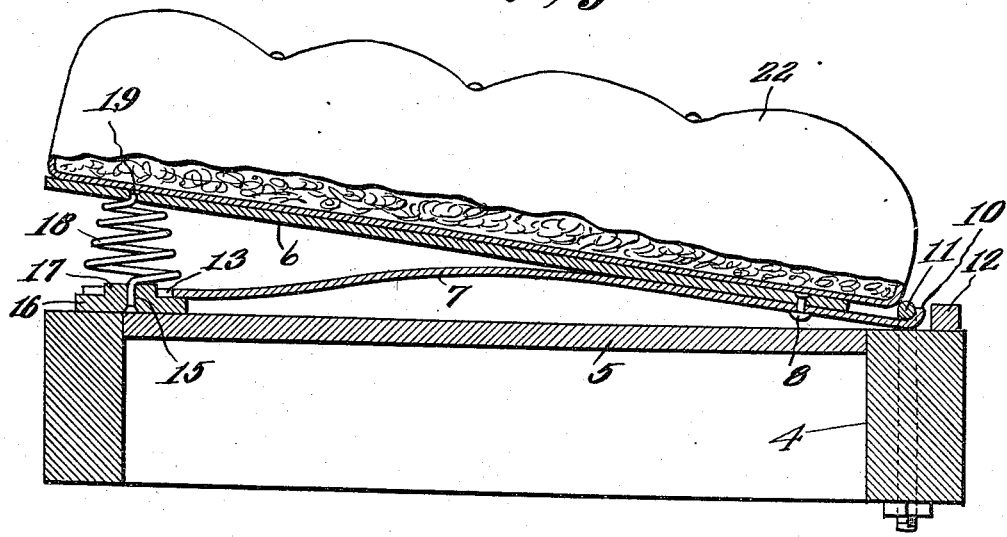
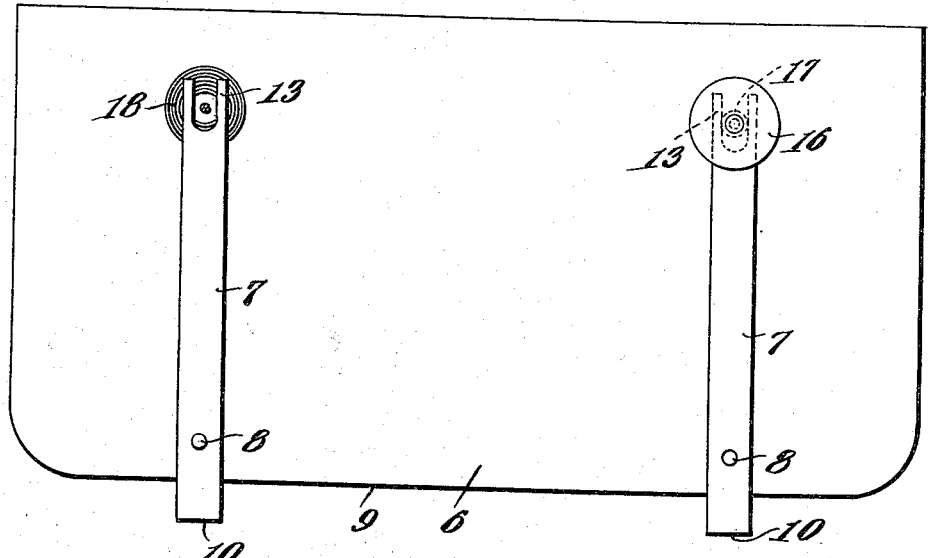
Witnesses
Daniel Warner,
Inventor
by C. A. Snow & Co.
Attorneys

UNITED STATES PATENT OFFICE.

DANIEL WARNER, OF BRONSON, MICHIGAN.

VEHICLE SEAT ATTACHMENT.

1,147,771.  Specification of Letters Patent.  Patented July 27, 1915.

Application filed June 8, 1914. Serial No. 843,825.

*To all whom it may concern:*

Be it known that I, DANIEL WARNER, a citizen of the United States, residing at Bronson, in the county of Branch and State of Michigan, have invented a new and useful Vehicle Seat Attachment, of which the following is a specification.

This invention relates to a vehicle seat attachment.

The object of the present invention is to provide a device which may be easily and quickly secured to the seat of a vehicle and when positioned thereon is adapted to support the seat cushion in such a manner that a person seated thereon will be protected from excessive jars or jolts incident to the passing of a vehicle over a rough or bad road.

A further object is to provide an attachment easily securable to a vehicle seat and readily detachable therefrom, the attachment being simple in construction, embodying few parts and being therefore subject to economical manufacture.

Another object is to support and mount a cushion supporting plate in a novel manner whereby the cushion supporting plate will be protected against jars and jolts due to a leaf spring and will be free from rebound due to a helical spring; and to further provide a novel connection between the helical and semi-elliptical or leaf spring, allowing for the elongation of the elliptical spring and holding the helical spring against transverse shifting.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention has been illustrated, in which:—

Figure 1 is a cross sectional view of my improved vehicle seat attachment, illustrating the same as secured to a vehicle seat and with a cushion supported thereon. Fig. 2 is a bottom plan view of the attachment in which one of the spring holding members has been removed to disclose the bifurcated end of the leaf spring.

Referring to the drawings in which similar reference numerals designate corresponding parts throughout the several views, a vehicle seat, sectionally illustrated in Fig. 1, includes a frame 4 and top 5. It is to be noted that this construction of seat merely designates the conventional type.

A cushion supporting plate 6 is provided with the symmetrically arranged and transversely extending leaf or semi-elliptical springs 7. These springs are approximately equal to the transverse width of the plate but are shifted with respect thereto and are rigidly secured to the seat plate by the rivets 8. The rivets 8 are located adjacent the rear edge 9 of the seat plate and extend through the leaf springs at one side of their center. The homologous springs each include the upturned rear end 10 and the slotted front end 13. A staple 11 or allied device capable of performing a similar function, is rigidly secured to the seat and rotatably receives the bent end 10 of the spring thereneath. A stop 12 is rigidly secured to or formed as a portion of the seat 4 and is located a slight distance to the rear of the staple and prevents the shifting of the leaf spring in a rearward direction. The cushion supporting plate has been illustrated, in the present drawings, as being provided with two leaf springs, which will require two staples and stops. It is to be noted, however, that the number of springs may be changed according to the size or extent of the plate 6.

The bifurcated front end 13 of the elliptical spring receives the upstanding lugs 17 of the spring holding plate 16 therein. The spring holding plate 16 is considerably larger than the transverse width of the elliptical spring and extends out thereover and thus forms a surface upon which the elliptical spring is adapted to slide. The spring holding plate 16 rests down upon the vehicle seat top 5 and remains stationary thereon, thus preventing the elliptical spring from scratching or marring the vehicle seat as the elliptical spring is flexed. The upstanding lug 17 extending between and through the bifurcated end of the elliptical spring holds the spring holding plate and elliptical spring in proper relation. In this connection it is to be noted that each elliptical spring is provided with one of these spring holding plates and acts in a manner similar to the foregoing. A spiral and helical spring 18 is secured to the cushion holding plate as at 19 and extends down to the aperture 15 within the spring holding plate 16. The spiral helical spring is thus positively secured to the cushion holding plate and to the spring holding plate 16, thus modifying the resiliency of the elliptical spring.

A cushion 22 is positioned upon the plate 6 and is resiliently supported thereby. By securing the leaf spring to the plate 6 adjacent its rear edge, it provides that in addition to the direct elongating and resilient action by applying a weight to the raised portion of the leaf spring, a leverage action will be obtained, producing a bending moment in the spring, tending to locally bend the spring at its point of juncture or connection with the plate in an outward or upward direction and tending to bend the spring in a downward direction at parts directly there in front. In addition to the foregoing, the resilient elongation of the leaf spring will be obtained. The spring will slide easily upon the spring holding plate 16, and experience little friction in so doing, thus providing for the smooth operation of the various parts. The helical spring modifies the action of the elliptical spring to the extent that the rebounds or vibrations of the spring are prevented.

The attachment herein disclosed may be easily and quickly secured to a vehicle seat and will support the cushion in a resilient manner, providing for the easy riding and comfort of the passengers or occupants of the vehicle.

Having thus fully described my invention, what I claim is:—

1. A vehicle seat attachment comprising a cushion supporting plate, a leaf spring rigidly secured thereto adjacent the rear edge thereof, the rear extremity of said leaf spring provided with means for securing the same to a vehicle seat, a spring holding plate receiving the forward bifurcated extremity of said leaf spring thereagainst, and a coiled spring engaging the spring holding plate and the cushion supporting plate adapted to dampen the vibrations of the leaf spring with respect to said cushion supporting plate.

2. A vehicle seat attachment comprising a cushion supporting plate, leaf springs extending transversely of said plate and rigidly secured thereto adjacent the rear edge thereof, said leaf springs provided with rear upturned ends projecting beyond the said cushion supporting plate, a supporting structure provided with staples secured thereto, stops juxtaposed and in the rear of said staples, the forward extremities of said leaf springs provided with slots therein, a spring holding plate with an upstanding lug slidably extending within the said leaf spring slots, said spring holding plate resting upon the said supporting structure and receiving the leaf springs thereon and providing for their motion relative thereto, and means for engaging said spring holding plates and the cushion holding plate adapted to dampen the vibrations between the cushion supporting plate and said leaf springs.

In testimony that I claim the foregoing as my own, I have hereto affixed my signature in the presence of two witnesses.

DANIEL WARNER.

Witnesses:
A. LE ROY LOCKE,
LOTTIE E. FARRAND.

Copies of this patent may be obtained for five cents each, by addressing the "Commissioner of Patents, Washington, D. C."